United States Patent [19]

Seyfang

[11] Patent Number: 5,037,044
[45] Date of Patent: Aug. 6, 1991

[54] AERODYNAMIC OR HYDRODYNAMIC SURFACES

[75] Inventor: George R. Seyfang, Preston, United Kingdom

[73] Assignee: British Aerospace public limited company, London, England

[21] Appl. No.: 116,760

[22] Filed: Nov. 4, 1987

[30] Foreign Application Priority Data

Nov. 4, 1986 [GB] United Kingdom ............... 8626371

[51] Int. Cl.$^5$ .............................................. B64C 3/58
[52] U.S. Cl. .................................... 244/199; 244/198
[58] Field of Search ............... 244/198, 199, 200, 204

[56] References Cited

U.S. PATENT DOCUMENTS

| | | | |
|---|---|---|---|
| 2,358,985 | 9/1944 | McAndrew | 244/198 |
| 2,743,888 | 5/1956 | Lippisch | 244/199 |
| 2,769,602 | 11/1956 | Furlong | 244/199 |
| 2,885,161 | 5/1959 | Kerker et al. | 244/199 |
| 3,130,944 | 4/1964 | Creasey | |
| 3,288,399 | 11/1966 | Gaster | |

FOREIGN PATENT DOCUMENTS 434778 10/1926 Fed. Rep. of Germany ...... 244/200

OTHER PUBLICATIONS

Patrick Stephens, "English Electric/BAC Lighting" (1984), pp. 20–23.
Francis K. Mason, "Hawker Aircraft since 1920", (1971), pp. 346–347.
Flight International, "Hawk Clears Spins and Armament", (1976), pp. 408–410.
"Hochgeschwindigkeits-Aerodynamik" 1961, pp. 56–61, Birkhauser Verlag, F. Dubs.
"Fluid-Dynamic Lift" 1975, pp. 16-12 to 16-14, S. F. Hoerner.

Primary Examiner—Margaret A. Focarino
Assistant Examiner—James M. Kannofsky
Attorney, Agent, or Firm—Cushman, Darby & Cushman

[57] ABSTRACT

An aerodynamic or hydrodynamic surface having a swept-back leading edge includes at least one flow separation device located on an attachment line of the leading edge, such as a step-up, step-down, fence or gap. The flow separation devices are preferably arranged normal to the leading edge and are dimensioned so that span-wise turbulent air flow is re-laminarized downstream of the devices thus reducing skin-friction and greatly improving the aerodynamic or hydrodynamic efficiency of the surface.

4 Claims, 2 Drawing Sheets

AERODYNAMIC OR HYDRODYNAMIC SURFACES

The invention relates to aerodynamic or hydrodynamic surfaces such as wings, tails, bows or keels and in particular to such surfaces having leading edges inclined to the air or water flow direction at angles other than 90°. Although the invention is described herein with reference to swept-back wings for aircraft it is to be understood that the invention is equally applicable to other aerodynamic or hydrodynamic surfaces, such as swept-forward wings, pylons, delta tails, fins and bows and keels of sailing boats. It is probable that the invention would also be applicable to the rotor blades of a helicopter.

It is well known that it is desirable to design aerodynamic surfaces in such a way that laminar boundary layer flow of air over the surfaces is assured. Laminar boundary layer flow has a skin friction drag much lower than that with turbulent boundary layer flow. During the 1940's aircraft were designed, constructed and operated with significant amounts of laminar flow on their wings with a consequential improvement in flight performance. The introduction of swept-back wings during the 1950's made the achievement of laminar flow more difficult and much less wide spread and this was identified during the 1960's as being due to 'leading edge contamination'. This contamination is a span-wise flow in the wing root to wing tip direction along the swept-back wing leading edge attachment line and only occurs with swept-back wings or the like. Such span-wise flow is nominally zero on straight, unswept wings.

FIG. 1a and FIG. 1b illustrate the problem with known swept-back wings. FIG. 1a is a plan view of a right-hand swept-back aircraft wing 1 attached to a fuselage 2 along a junction line 3. FIG. 1b shows a left-hand swept-back wing 1 in a perspective view. In normal flight the airflow over the wings, indicated by the arrows 4 splits at the leading edge of the wing into air flowing over the upper surface (arrows 4') and air flowing over the undersurface (arrows 4"). At some point on the wing leading edge the air neither passes over or under the wing and a relatively high pressure stagnation point 5 builds up. The locus of such stagnation points 5 span-wise along the leading edge is known as the attachment line shown as the dotted line 6 in FIG. 1b.

Recently, there has been some experimental work at Cranfield College of Aeronautics in which leading edge contamination has been investigated and the major parameters of wing leading edge sweep angle and wing leading edge radius which determine whether laminar flow can exist at a given flight condition have been identified. It has been found that in the vicinity of the wing root fuselage boundary layer flow, which is already turbulent, can run out along the wing leading edge at the wing fuselage junction 3 as indicated by the dotted arrow lines 7 in FIGS. 1a and 1b, and then the possibility of achieving wing laminar flow is greatly reduced. Wing fuselage blending at the wing root 3 for example by means of fillets or fairings merely increases the probability that turbulent flow proceeds in a spanwise direction along the wing.

Even without the fuselage wing interaction described above, any roughness on the swept stagnation line or attachment line 6 of the leading edge of swept-back wings results in an airflow which span-wise and chordwise from the point of roughness is turbulent.

It is an object of the present invention to provide an aerodynamic or hydrodynamic surface in which any span-wise turbulent flow is arrested and re-laminarised. The advantage in achieving such an object is that skin-friction is reduced so that the aerodynamic/hydrodynamic efficiency of the surface is improved.

The flow separation device may be a rearward facing step (step down), a forward facing step (step up), a combination of a forward facing step and a rearward facing step spaced a relatively short distance apart and forming a "fence" on said leading edge, or a combination of a rearward facing step and a forward facing step spaced a relatively short distance apart and forming a "gap" in the leading edge.

Preferably the flow separation device is arranged to be normal to the leading edge but it may be angled and/or curved and still be effective.

Where the flow separation device is a fence or a single step, fence and step heights preferably lie in a range 2%r to 40%r where r is the leading edge radius. If the fence height is too small, typically of the same order as the boundary layer thickness of a ½%r or less, then it will not work and can indeed cause transition from laminar to turbulent flow.

Where the flow separation device is a gap ie, a step down followed by a step up then preferably the gap depth and gap width are substantially equal and substantially equal to 10%r where r is the leading edge radius. Where a gap in the leading edge already exists with a gap depth and width which are different by a factor 4 or more, so that the desired flow re-laminarisation will not work, the gap may be partially covered either side of the attachment line to enhance the naturally pumped rate of flow in the non-optimum gap.

The flow separation device may be applied to a relatively small arcuate segment of the leading edge so that at certain operating conditions it acts as a low-drag laminar flow producing device as described above but at other operating conditions it as a separation-resistant turbulent flow device. Thus for example on a combat aircraft the devices might be arranged to obtain low-drag laminar flow at low or moderate wing angles of incidence to the air flow, applicable to economical cruising and high speed flight, yet maintain or promote separation-resistant turbulent flow at higher angles of incidence applicable to take-off and landing and/or combat manoeuvring close to the stall.

The term 'leading edge' to which the flow-separation device may be applied is no restricted to the generally semi-cylindrically shaped leading edges of swept back wings and keels but may include any surface inclined to the air or water flow in use and upon which it is desired to establish/re-establish laminar flow. For example the 'leading edge' may be the generally planar underside of a generally shallow 'vee' shaped spacecraft rounded at the apex. On re-entry to the earth's atmosphere after a space flight the spacecraft will adopt a generally nose-up attitude and this underside will be inclined to the air flow to decelerate the vehicle and to re-establish aerodynamic control. If the airflow on the underside is turbulent, heat generated by friction between the vehicle and the air will be transferred, undesirably, to the vehicle. However, by deploying one or more flow separation devices as described above on the underside of the vehicle, in the form of slots, fences or steps laminar flow will be established and heat transfer to the vehicle will be minimised.

Embodiments of the invention will now be described by way of example only and with reference to FIGS. 1c, 1d and 1e and FIGS. 2a and 2b of the accompanying drawings of which:

Figure 1A:
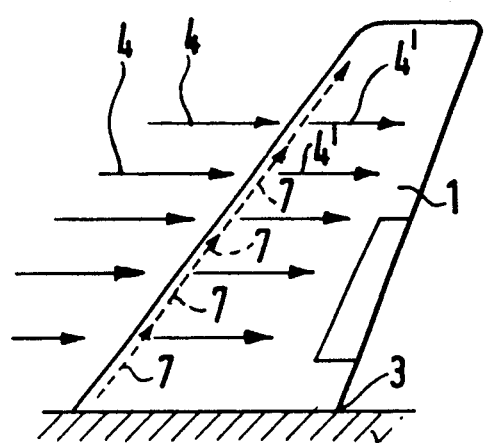
FIG. 1c shows a plan view of a swept-back wing.
FIG. 1d shows a plan view of another swept-back wing.
FIG. 1e shows a plan view of yet another swept-back wing.
Figure 1B:
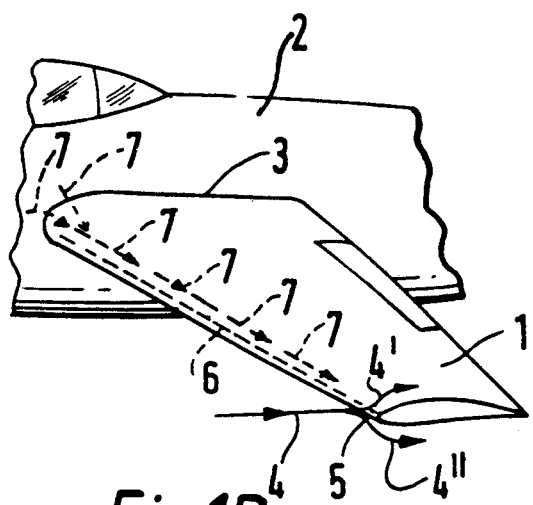
Figure 1C:
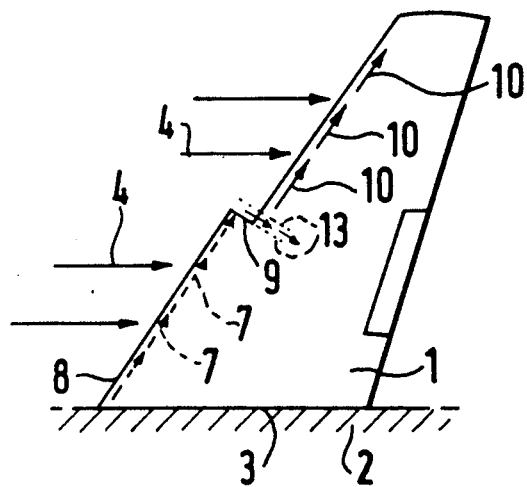

In FIG. 1c the leading edge 8 of a swept-back wing 1 attached to a fuselage 2 along a wing fuselage junction 3 has a rearward facing step 9 at some point along its span-wise length. The length of the step lies in the range 2%r to 40%r where r is the radius of curvature of leading edge 8.

In operation, when the aircraft to which the wing 1 attached is moving in forward flight the airflow 4 meets the swept-back leading edge 8 at an angle. Turbulent air 7 from the fuselage 2 flows in a spanwise direction substantially along the attachment line of the flow 4 on the leading edge 8. Outboard of the step 9 the spanwise flow becomes laminar as indicated by the arrows 10. With laminar spanwise airflow skin friction is reduced and the aerodynamic efficiency of the wing is improved.

Figure 1D:
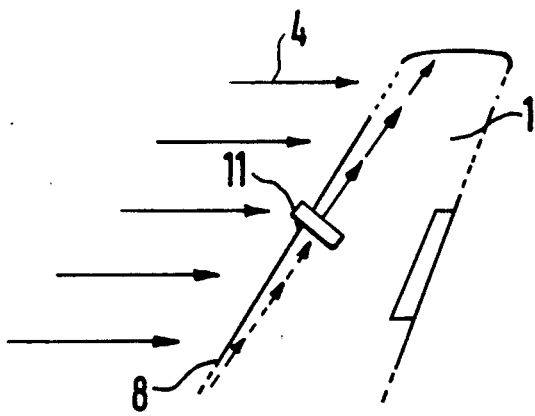
Figure 1E:
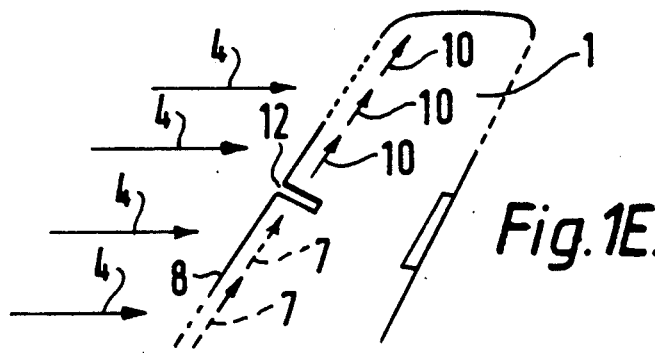

Similar advantages of gained by the use of a fence 11 or a gap 12 on the leading edge 8 as shown on the FIGS. 1d and 1e. The dimensions of the fence 11 are such that the fence height is in the range 2%r to 4%r where r is the leading edge radius. There a gap 12 is used as shown in FIG. 1e the gap depth and gap width are substantially equal and equal to 10%r where r is the leading edge radius. It has been found however that where the gap depth and gap width are different by typically a factor of the order of 4 or more the desired flow relaminarisation will not work unless the gap is partially covered either side of the attachment line to enhance the naturally pumped rate of flow in the non-optimum gap.

The theory behind the operation of the invention is not entirely understood but one explanation is as follows:

a) In the separated flow region behind a rearward facing step (step down) such as 9 in FIG. 1c there is a stable, closed or trapped vortex flow region indicated by the parallel dotted lines 13 in FIG. 1c. Similar trapped vortices are formed by forward facing steps, fences and gaps such as the fences 11 and the gap 12 as shown in FIG. 1d and 1e.

b) The air flow past a rounded leading edge 8 produces a high pressure at the stagnation (attachment line) point and regions of lower pressure either side of this point. In FIG. 1b, for example, the regions indicated by 4' and 4" would be relatively low pressure areas compared with the region indicated by 5.

c) When a trapped vortex 13 is wrapped around a rounded swept back leading edge by use of a step 9 etc, then there are pressure differences along this trapped vortex amounting to suctions from either side of the attachment line.

d) It is postulated that these suctions, channelled and constrained through the trapped vortex, cause the turbulent boundary layer 7 which has separated from the attachment line region to be sucked away. Fresh air from outside the boundary layer then re-attaches and a laminar flow 10 is established.

It will be appreciated that the steps, fences and gaps described above are not the only flow separation devices that may be used to implement the invention. The flow separation devices need not be normal to the leading edge. Flow separation devices may be used equally well on tails, fins, pylons and in hydrodynamic cases on bows and keels of sailing boats.

Re-laminerising devices according to the invention are much smaller than other flow separation devices and are typically only 10% of the leading edge radius, ie, a few millimetres or less and thus unlikely to disturb the main flow characteristics. Moreover the re-laminerising devices according to the invention are effective over a large angle of incidence range, perhaps 10° or more, and thus able to be effective over the full range of operating (flight) conditions. Previous devices had been limited to 1° or 2° only and hence were ltmited to one unique operating condition.

Re-laminerising devices according to the invention are simple non-critical shapes tolerant of damage and improper installation. They are effective over a wider of speed range than previous flow separation devices and in particular are likely to be useable throughout the subsonic, transonic, supersonic and hypersonic speed regimes.

The re-laminerisation devices according to the invention are totally passive, i.e., have minimal cost/trouble life cycles.

Tests have been carried out in a low speed wind tunnel to confirm the operation of the invention. A simple swept leading edge model representing a five times scale fighter wing edge was tested. The leading edge had a 53° angle and 55mm leading edge radius. When tested a 60 meters per second tunnel wind speed produced a full-scale Reynolds number equivalent to an aircraft flying at 300 meters per second at sea level. The effect of the aircraft being at higher altitude and/or lower speeds was represented by reducing the tunnel wind speed.

Several tests were made using the "China-Clay" technique to indicate the state of the boundary layer on the leading edge of the model. With a wing/fuselage junction absent and the model smooth the boundary layer was laminar. The addition of roughness by a simulated 'squashed-fly' produced a local chordwise wedge turbulent flow. Moreover when the squashed-fly roughness was applied on the centre-line of the model (the swept stagnation line or attachment line) all the flow spanwise and chordwise from this point was made turbulent. Similarly it was found that when the model was fitted with a wing/fuselage junction the turbulent 'fuselage' boundary layer was sufficient to cause turbulent flow spanwise over the whole wing.

Various step-ups, step-downs, fences and gaps were then applied to the model leading edge and the operation of the invention to produce laminar flow outboard of such flow separation devices confirmed.

Figure 2A:
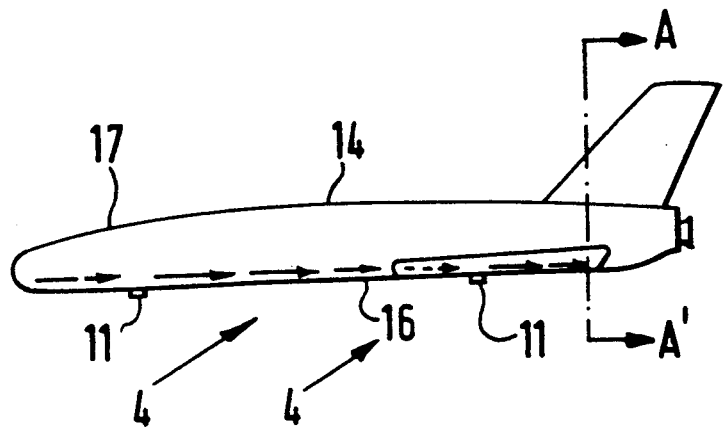
FIGS. 2a and 2b are a side elevation and a cross-section (along the line A—A' of FIG. 2a) respectively of a spacecraft re-entering the earth's atmosphere.
Figure 2B:
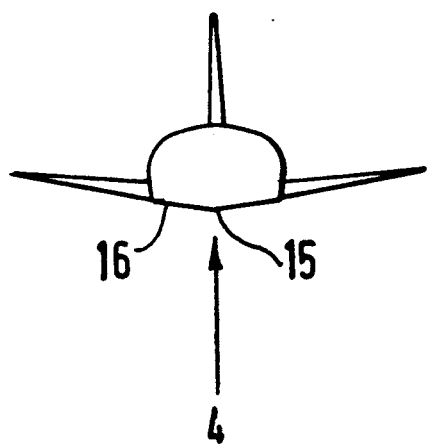

The flow-separation devices described above are not limited in application to the leading edges of swept-back aircraft wings. In FIGS. 2a and 2b we show a possible application to a spacecraft 14 comprising an aerodynamic lifting body and rearward mounted wings 17 of a generally shallow vee shape, in cross-section at the line A—A', rounded at the apex 15. The front fuselage is of generally cylindrical form. When such a spacecraft re-enters the earth's atmosphere after a space flight, for example, after an orbital flight to launch an earth satellite, it will adopt a generally nose-up attitude of about 40° angle of attack with respect to its line of flight and the air-flow over it, in order to decelerate it from orbital speed (typically 25,000 ft ps) to a more convenient flying speed and to re-establish aerodynamic control of the vehicle. During this re-entry phase, due to friction between the spacecraft and the air, the underside 16 of the lifting body will heat-up considerably. The boundary layer airflow along the underside 16 will suddenly transfer from low heating rate laminar flow to high heating rate turbulent flow in which heat will be undesirably and readily transferred to the spacecraft from the air. However by incorporating fences 11 and 11' (or slots, or steps) of a type described above, transverse to the fore and aft axis of the vehicle, on the underside 16 at forward and rearward locations respectively and extending substantially the full-width thereof airflow downstream of the devices 11 and 11' will be laminar and heat transfer to the vehicle during re-entry will be minimised. Consequently the mass penalty incurred by the use of conventional thermal protection systems such as heat resistant tiles may be substantially reduced. The air-flow along the underside of the forward, cylindrical, fuselage section of the spacecraft acts and is controlled by flow separation devices in much the same manner as the span-wise air flow along cylindrical leading edges of swept-back wings described above. In the region of the shallow vee cross-section of combined wings and fuselage (FIG. 2b) the apex of the vee forms an attachment line for the air-flow. Any roughness particle on this attachment line causes turbulent air flow downstream (ie, towards the tail of the spacecraft) which may be restored to laminar flow by means of the transverse fence 11' (or a slot or step) on the underside at an appropriate rearward point.

I claim:

1. An aerodynamic or hydrodynamic surface having a leading edge inclined at an angle to the normal to the general flow of air or water respectively over said surface when in use, including at least one leading edge boundary layer laminar flow control means, defined on said leading edge substantially at an attachment line thereof, for re-laminarising turbulent flow along the span-wise direction of the surface, said at least one boundary layer laminar flow control means including at least one of a rearward facing step and a forward facing step having a height in the range 2%r to 40%r where r is radius of the leading edge.

2. An aerodynamic or hydrodynamic surface as claimed in claim 1 wherein the at least one boundary layer laminar flow control means comprises a combination of a forward facing step and a rearward facing step spaced a relatively short distance apart and defining a fence on said leading edge.

3. An aerodynamic or hydrodynamic surface as claimed in claim 1 and where the boundary layer laminar flow control means is defined so as to be normal to said leading edge.

4. An aerodynamic or hydrodynamic surface having a leading edge inclined at an angle to the normal to the general flow of air or water respectively over said surface when in use, including at least on boundary layer laminar flow control means, defined on said leading edge substantially at an attachment line thereof, for re-laminarising turbulent flow along the span-wise direction of the surface, said at least one boundary layer laminar flow control means including at least one of a rearward facing step and a forward facing step having a height in the range 2%r to 40%r where r is radius of the leading edge, the at least one boundary layer laminar flow control means comprising a combination of a rearward facing step and a forward facing step spaced a relatively short distance apart and defining a gap in said leading edge, the gap depth and the gap width being substantially equal to 10%r where r is the radius of the leading edge.

* * * * *